INVENTOR
EMMIT VANDERMARK
BY Richard O. Church
ATTORNEY

INVENTOR
EMMIT VANDERMARK

United States Patent Office 3,497,265
Patented Feb. 24, 1970

3,497,265
MASTER CYLINDER AND RESERVOIR OPERATING MEANS FOR A BRAKE SYSTEM
Emmit Vandermark, R.D. 1, Harding, Pa.
Continuation-in-part of application Ser. No. 488,432, Sept. 20, 1965. This application Aug. 15, 1968, Ser. No. 752,831
Int. Cl. B60t 7/00
U.S. Cl. 303—2          4 Claims

ABSTRACT OF THE DISCLOSURE

An improved hydraulic braking system for wheeled vehicles is provided wherein an auxiliary hydraulic system is cooperatively associated with the main hydraulic braking system to provide hydraulic pressure to actuate the brakes of the vehicle for parking or in the event that there is a failure in the main braking system. When the auxiliary system is actuated, the front and rear braking systems are hydraulically isolated from each other and from the master cylinder.

---

This application is a continuation-in-part of my copending application Ser. No. 488,432, filed Sept. 20, 1965, now abandoned.

This invention relates to an improved braking system for motor vehicles and, more particularly, it relates to an auxiliary hydraulic braking system that functions both as an emergency device to bring a moving vehicle to a safe stop and as a parking brake.

For convenience of description, this invention will be described with specific regard to hydraulic braking systems such as are commonly found in automobiles. It should be understood, however, that this invention may be used in other types of vehicles and may be adapted for use in association with pneumatic braking systems as well.

It is conventional in automotive braking systems to provide a master hydraulic cylinder that, when actuated as by the movement of a brake pedal, causes hydraulic fluid under pressure to be transmitted by conduits (brake lines) to servo cylinders located at each of the wheels. The servo cylinders respond to the pressure of the hydraulic fluid and force the brake shoes, against a spring bias, into frictional engagement with the wheels, and, accordingly, cause the vehicle to decelerate. When the operator removes his foot from the brake pedal, the hydraulic pressure within the brake lines is relieved and the spring loaded brake shoes are withdrawn from frictional engagement with the wheels.

While brake systems of the above type have a comparatively high degree of reliability, the occasional failures that do occur may result in serious accidents. Many failures that are encountered in the use of these hydraulic brake systems are caused by a gradual loss of hydraulic fluid from the master cylinder. This gradual loss may easily go unnoticed until the brakes suddenly are found to be completely ineffective. The hazardous nature of this situation is obvious.

Brake failures also result from ruptures at any point in the hydraulic system. If, for example, any brake line ruptures, the integrity of the entire system will be destroyed. In this instance, hydraulic fluid will escape through the opening and it will not be possible to establish hydraulic pressure within the system and actuate any of the brake shoes.

A great deal of study has been given to the problem of avoiding brake failures of the above types and many solutions have been proposed. For example, some automobiles are currently being equipped with two separate hydraulic circuits. One of these circuits is operatively connected with the front wheel brakes and the other with the rear wheel brakes. If a rupture occurs in either circuit, the integrity of the other circuit will not be affected and braking either with the rear or front wheels will be possible. While this system does provide additional safety, it suffers from a major disability in that an operator may continue using one of the circuits without being aware of the fact that the other circuit is inoperative. He may thus drive for many months not knowing, for example, that there has been a failure in his front braking system. If a failure then occurs in the rear braking system, he suddenly will discover that he has no brakes at all. Thus, these tandem systems, unless continually inspected, may give rise to a false feeling of security.

Braking systems have been proposed in which two completely isolated and separate braking systems are provided. Each system is a complete entity in itself and includes not only separate and isolated hydraulic lines, but also separate servo cylinders, brake shoes and pressure actuating systems. While these systems have greater reliability, they have not been accepted due to the expense of providing two separate braking systems and the mechanical impracticability of providing two sets of brake shoes with their associated equipment at each and every wheel.

Accordingly, it is an object of this invention to provide an improved braking system that will be operable to bring a vehicle to a safe stop notwithstanding the loss of hydraulic fluid from the master cylinder or a rupture at any point in the hydraulic system.

It is another object of this invention to provide an auxiliary braking system that will be operable to bring a vehicle to a safe stop in the event that there is a failure at any point in the normal braking system.

Yet another object of this invention is to provide continual visual indication of the operational readiness of the auxiliary braking system.

A related object of this invention is to provide a hydraulic parking brake.

A further object of this invention is to provide an auxiliary hydraulic braking system that will function both as an emergency service brake and as a normal parking brake.

And still another object of this invention is to provide a device that simply and inexpensively will enable modifying existing braking systems to provide an emergency hydraulic service brake and a hydraulic parking brake.

Briefly, these and other objects of this invention are achieved by providing a system that includes: at least two reservoirs of brake fluid under pressure; first valved means independently communicating between each of such reservoirs and a separate brake line circuit; and second valved means communicating between each of such reservoirs and the master cylinder; said first and second valved means being adapted, when the system is actuated, to isolate the master cylinder from the reservoirs and the several brake line circuits, to isolate the several brake line circuits from each other, and to provide brake fluid under pressure from each of the reservoirs directly to their associated and hydraulically isolated brake line circuit.

In order that this invention may be better understood, it will now be described with regard to the accompanying drawings in which.

Figure 1:
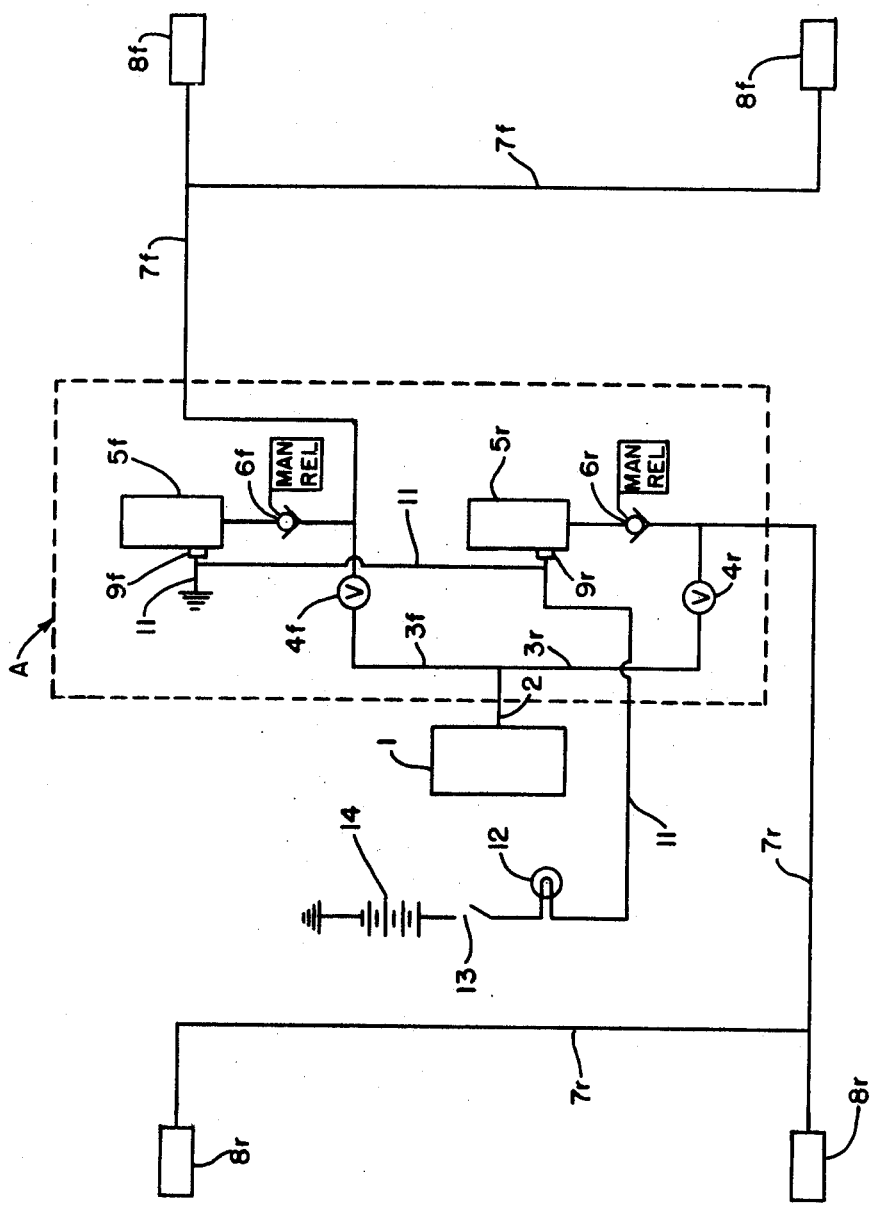
FIGURE 1 is a schematic representation of the auxiliary braking system of this invention.

In FIGURE 1 there is a highly schematic representation of the auxiliary braking system of this invention. Generally there is shown a master cylinder 1 that is in hydraulic communication with the servo cylinders 8f and 8r located at the front and rear wheels of an automobile respectively. Communication is established between the master cylinder 1 and the servo cylinders 8f associated with the front wheel brakes by means of hydraulic brake lines 2 and 3f, stop valve 4f, and brake line 7f. Similarly, the master cylinder 1 is in hydraulic communication with the servo cylinders 8r associated with the rear wheel brakes by means of conduits 2 and 3r, stop valve 4r, and brake line 7r. In the normal operation of the service brakes, valves 4f and 4r located in lines 3f and 3r respectively are open and permit the uninterrupted flow of hydraulic fluid therethrough. Accordingly, when the brake pedal is depressed, hydraulic fluid will be conveyed from the master cylinder 1 directly to both the front and rear servo cylinders 8f and 8r.

Hydraulically intermediate the front servo cylinders 8f and the valve 4f, there is provided a hydraulic accumulator 5f that communicates via a one-way valve 6f with hydraulic line 7f at a point located hydraulically between valve 4f and the front wheel servo cylinders 8f. Similarly, with respect to the rear braking system, a hydraulic accumulator 5r is provided that communicates via a one-way valve 6r with hydraulic line 7r at a point located hydraulically between valve 4r and the rear wheel sero cylinders 8r. In normal operation of the serice brakes, the one-way valves 6f and 6r are seated by the pressure within the accumulators so that hydraulic fluid may be pumped into the accumulators 5f and 5r, but not, under normal operating conditions, discharge therefrom.

While not shown in the schematic presentation of FIGURE 1, it should be understood that the operation or function of the valves 4f, 4r, 6f and 6r preferably can be controlled by a single electrical or mechanical control. This control has two positions. The first position is for normal operation of the service brakes and the stop valves 4f and 4r will be open while the one-way valves 6f and 6r will be permitted to seat with the pressure within the hydraulic accumulators 5f and 5r. In the second position, the stop valves 4f and 4r are shut and the one-way valves 6f and 6r are lifted off of their respective seats enabling the free flow of hydraulic fluid between the hydraulic accumulators 5f and 5r and the brake lines 7f and 7r respectively.

The hydraulic accumulators 5f and 5r can be of any standard type, including spring loaded, pneumatic, or combinations thereof. It is of importance, however, that the accumulator be capable of storing a hydraulic fluid at the working pressure of the braking system. Commonly, with respect to motor vehicles, this is about 800 p.s.i.

Pressure switches 9f and 9r are associated with the hydraulic accumulators 5f and 5r respectively. The pressure switches 9f and 9r are connected in series by means or conductive wire 11. One of the pressure switches is connected to ground and the other connected to an indicating device, such as a lamp 12, that may be located at a conspicuous point on the dashboard of the vehicle. The electrical circuit may be completed by means of ignition switch 13 that closes the connection to battery 14.

In normal operation as a service brake, actuation of the master cylinder 1 by the brake pedal will, as previously described, cause hydraulic fluid under pressure to be conveyed to both the front 8f and rear 8r servo cylinders. Further, hydraulic accumulators 5f and 5r may be charged with hydraulic fluid at working pressures when the brake pedal actuates the master cylinder. This is accomplished since the pressure of the hydraulic fluid in the system will unseat the one-way valves 6f and 6r and allow hydraulic fluid to enter the respective hydraulic accumulators 5f and 5r until such time as the hydraulic pressure in the accumulators equals or exceeds the working pressure developed by the master cylinder 1. When the pressure within the hydraulic accumulators 5f and 5r reaches a predetermined level, pressure switches 9f and 9r close, thus turning on lamp 12 if the ignition is turned on. Note that by wiring pressure switches 9f and 9r series, the lamp will now light unless the pressure in each of the hydraulic accumulators 5f or 5r reaches a predetermined operational minimum level.

When it is desired to use this system for emergency braking or as a parking brake, valves 4f, 4r, 6f and 6r are shifted from their normal position so that stop valves 4f and 4r are shut and check valves 6f and 6r are lifted off of their seats. This enables hydraulic fluid under pressure to be supplied to the front wheel brake servo cylinders 8f from the accumulator 5f via one-way valve 6f, now lifted off of its seat, and conduit 7f. In a similar manner, the rear wheel brake servo cylinders 8r will be supplied with hydraulic fluid from hydraulic accumulator 5r via one-way valve 6r and brake line 7r. Since stop valves 4f and 4r are now shut, the entire braking system is hydraulically isolated from the master cylinder and the front and rear braking circuits are hydraulically isolated from each other. Thus, if there is a rupture or other failure at any point within the hydraulic system, or if there is insufficient hydraulic fluid in the accumulator 1, this device will insure that at least either the front or the rear brakes will be effective to bring the vehicle to a stop. After the car has been stopped and the source of the difficulty noted and corrected, valves 4f and 4r can be opened and valves 6f and 6r permitted to seat. The brake pedal is then pumped several times to restore full operating pressure in the hydraulic accumulators 5f and 5r and the lamp 12 will light to indicate that the braking system is once again in functional readiness.

As previously mentioned, the auxiliary braking system of this invention may also be used as a parking brake, thus eliminating the need for a separate parking device on motor vehicles. The operation of this auxiliary system as a parking brake is identical to its operation as an emergency brake, that is, the one-way valves 6f and 6r are lifted off of their seats and the high pressure fluid in the accumulators 5f and 5r sets the brakes. It has been demonstrated that the application of hydraulic pressure to the front and rear servo cylinders may be continued for almost an indefinite period of time by these means.

The operation of valves 4f, 4r, 6f and 6r may be controlled by any suitable mechanical or electromechanical means. These means can be actuated variously by a simple lever, push button or solenoid mounted at any convenient place, such as on the dashboard. They can be operated by an auxiliary foot pedal or they may be actuated by the regular brake pedal should it travel to the "floor" due to the loss of hydraulic fluid in the braking system. In this latter instance, the operating linkage would be actuated by the brake pedal if it overtraveled its normal brake-engaging position.

Figure 2:
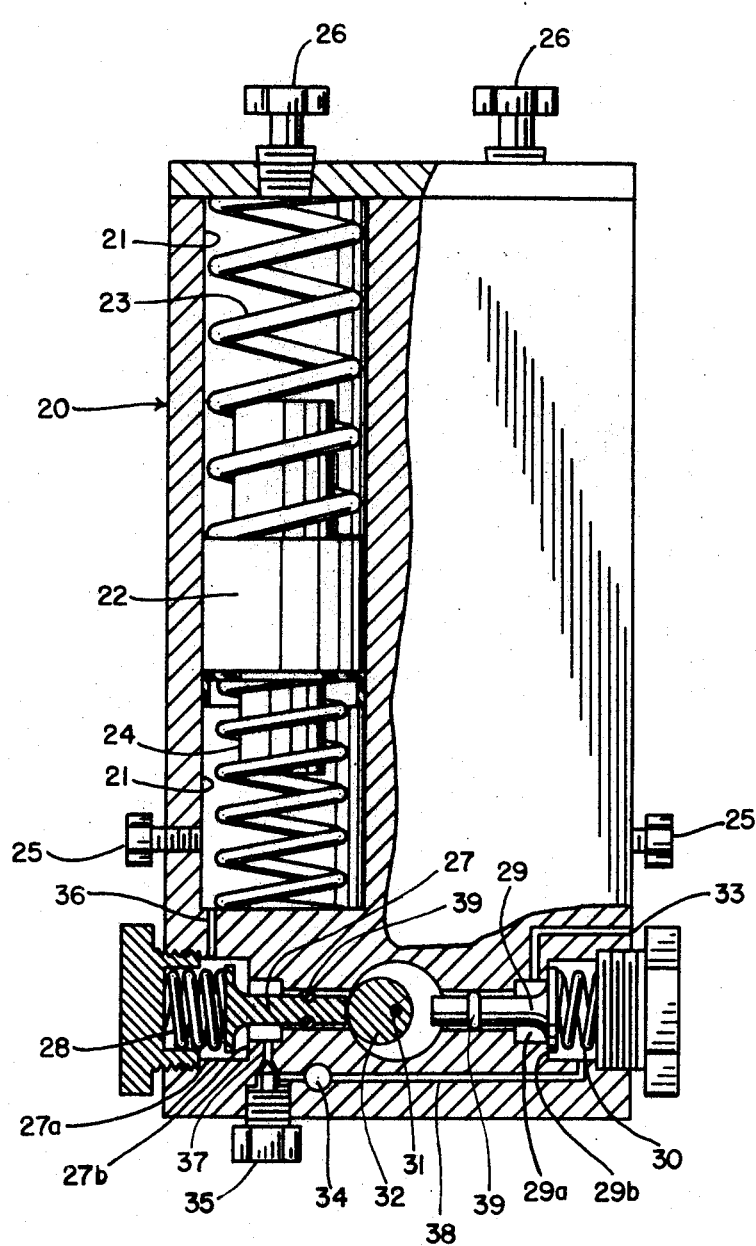
FIGURE 2 is a front elevation, partially in section, of a combined valve body and hydraulic accumulator adapted for use in the auxiliary braking system of this invention.

While the exact apparatus used is not critical in the invention, a preferred apparatus for practicing this invention is illustrated in FIGURE 2. The device here illustrated comprises a single housing that includes all of the valves, pressure switches and hydraulic accumulators shown within the dotted lines and designated "A" in FIGURE 1. This device is particularly advantageous as it permits a simple means fo rmodifying existing braking systems to operate in accordance with this invention by merely inserting the device in conventional brake lines.

In FIGURE 2 there is generally shown a combination valve body and accumulator block 20 with the left portion of the block 20 shown cut away. The block 20 includes two accumulator cylinders 21, but for convenience of description, only the left hand one designed to operate the front brakes is described. It can readily be understood that the right hand system is designed to operate the rear brakes and is constructed in identical fashion to the left hand system.

Within the hydraulic accumulator cylinder 21 there is located a piston 22 that moves against spring pressure 23. A resilient bottom stop and associated spring 24 may be provided. An air bleed 26 is provided at the top of the cylinder to enable the escape of air when charging the accumulator and is also convenient to provide a bleed 25 at a lower portion of the accumulator. The bottom of the accumulator cylinder 21 communicates via a conduit 36 to the interior of a valve housing 27a. A valve 27 is provided with a valve seat as at 27b. When the valve 27 is removed from its seat 27b, fluid within the valve housing 27a can communicate via conduit 37, a needle control valve 35 to a connection 34 that leads to the front brakes. An operating shaft 31 has a cam 32 mounted eccentrically thereon. When moved to a position as shown in the figure, the cam 32 lifts valve 27 off of its seat in opposition to the spring bias 28.

A second valve 29 is contained in valve housing 29a. The second valve 29 is biased to remain on valve seat 29b by means of spring bias means 30. A conduit 33 communicates between the interior of valve housing 29a and the master cylinder (not shown). Thus, when valve 29 is lifted off its seat, an uninterrupted communication from the master cylinder to the front wheel brakes (not shown) is established by means of conduit 33, the valve 29, conduit 38 and the connection to the front wheel brake line 34.

In operation as a parking brake or for emergency purposes, the operating shaft 31 is rotated into the position shown in the drawing, thus causing eccentric cam 32 to disengage the stem of valve 29. The spring bias 30 will then cause the valve 29 to engage seat 29b and interrupt communication between the master cylinder and the front brakes. The same rotation causes cam 32 to engage the stem of valve 27 and lift off its seat 27b. Hydraulic fluid stored in the accumulator cylinder 21 may now pass through valve housing 27a, conduit 37, control needle valve 35, and the connection 34 to energize the front servo cylinders to set the front brakes. The force with which the brakes are applied and the rate at which the vehicle is brought to a stop is controlled by the adjustment of the needle valve 35. Note that the hydraulic fluid in conduit 38 will aid spring bias 30 in causing valve 29 to seat firmly on its seat 29b, thus preventing the escape of hydraulic fluid through valve housing 29a back to the master cylinder and into the rear brake lines.

When it is desired to remove the brake either after it has been used for emergency purposes or as a parking brake, operating shaft 31 is rotated to move eccentric cam 32 out of contact with the stem of valve 27 causing valve 27, due to the spring bias 28, to engage its seat 27b.

By the same action of eccentric cam 32, the stem of valve 29 is engaged and valve 29 is lifted off its seat 29b. The connection 34 leading to the front brakes now provides direct communication, via conduit 38, housing interior 29a, and conduit 33, with the master cylinder, so restoring the braking system to its normal operation. When the master cylinder is now actuated, pressure will also be transmitted by line 38 through conduit 37, to the underside of valve 27. When the pressure within cylinder 21 is less than the pressure imposed by the master cylinder, valve 27 is lifted off of its seat 27b and high pressure hydraulic fluid will flow into the cylinder 21. This will compress spring 23 and the accumulator will continue to charge, as long as the brake pedal is pumped, until such time as the pressure within the accumulator balances the operating pressure being developed by the master cylinder. The device is now fully operational and is ready for use either as an emergency brake or as a parking brake. As discussed with respect to FIGURE 1, pressure switches may also be included within this housing 20 in communication with the cylinder 21. When pressure has reached a safe level, for example about 500 pounds per square inch, the pressure switches are closed and a lamp on the dashboard may be caused to light to indicate that the system is fully operational.

I claim:

1. In a hydraulic braking system for wheeled vehicles including a master cylinder, separate braking means associated with each wheel of the vehicle, separate hydraulic servo mechanisms associated with each braking means adapted to control the action of the braking means, first hydraulic lines communicating between the master cylinder and a first group of servo mechanisms, and second hydraulic lines communicating between the master cylinder and a second group of servo mechanisms, the improvement comprising:

first and second reservoirs adapted to store brake fluid under pressure;
  first and second conduit means communicating between the first and second hydraulic lines and the first and second reservoirs, respectively;
  first valve means in each of the first and second hydraulic lines hydraulically located intermediate the master cylinder and the first and second conduit means;
  second valve means in each of the first and second conduit means hydraulically located intermediate the first and second reservoirs and the first and second hydraulic lines, respectively; and
  single control means for simultaneously altering the function of the first and second valve means, the control means having:
    a first normal operating position in which the first valve means are open and the second valve means are shut whereby normal braking is achieved through operation of the master cylinder; and
    a second brake-engaging position in which the first valve means are shut and the second valve means are opened whereby hydraulic communication is prevented between the first and second hydraulic lines, hydraulic communication is prevented between the first and second hydraulic lines and the master cylinder, and brake fluid under pressure is delivered from the first and second reservoir to the first and second group of servo mechanisms, respectively.

2. In a fluid pressure braking system for a vehicle having two groups of wheels, each wheel having a fluid pressure operated braking device, the system including a master fluid pressure cylinder, with separate fluid pressure lines connecting the master cylinder with the braking devices for the two groups of wheels:

for each of the pressure lines,
    (a) a shut-off valve biased to closed position and having control means normally holding the valve open to provide for normal braking under the action of the master cylinder, and
    (b) an accumulator connected through a check valve with the fluid pressure line at a point between its shut-off valve and the connected braking devices, the check valve normally preventing flow from the accumulator into the fluid pressure line but permitting flow from said line into the accumulator and having control means for opening the check valve when the shut-off valve is closed and thus provide for braking independently of the master cylinder.

3. A construction as defined in claim 2 and further including common operating means for said two valve control means providing for substantially concurrent closing of the shut-off valves and opening of the check valves.

4. A hydraulic braking system according to claim 1 in which the second valve means are comprised of one-way valves that, when the control means are in the first normal operating position, permit hydraulic fluid to flow from the first and second hydraulic lines to the first and second reservoirs respectively if the pressure in the first and second hydraulic lines exceeds the hydraulic pressure in the first and second reservoirs.

(References on following page)

References Cited

UNITED STATES PATENTS

| | | | |
|---|---|---|---|
| 2,467,560 | 4/1949 | Majneri | 60—54.5 |
| 2,871,995 | 2/1959 | Cline | 60—54.5 X |
| 3,114,581 | 12/1963 | Tuszynski | 303—2 |
| 3,251,187 | 5/1966 | Mossback | 303—2 X |

MILTON BUCHLER, Primary Examiner

J. J. McLAUGHLIN, JR., Assistant Examiner

U.S. Cl. X.R.

60—54.5; 137—598; 188—151, 152; 192—3; 303—6, 9, 89